No. 779,479. Patented January 10, 1905.

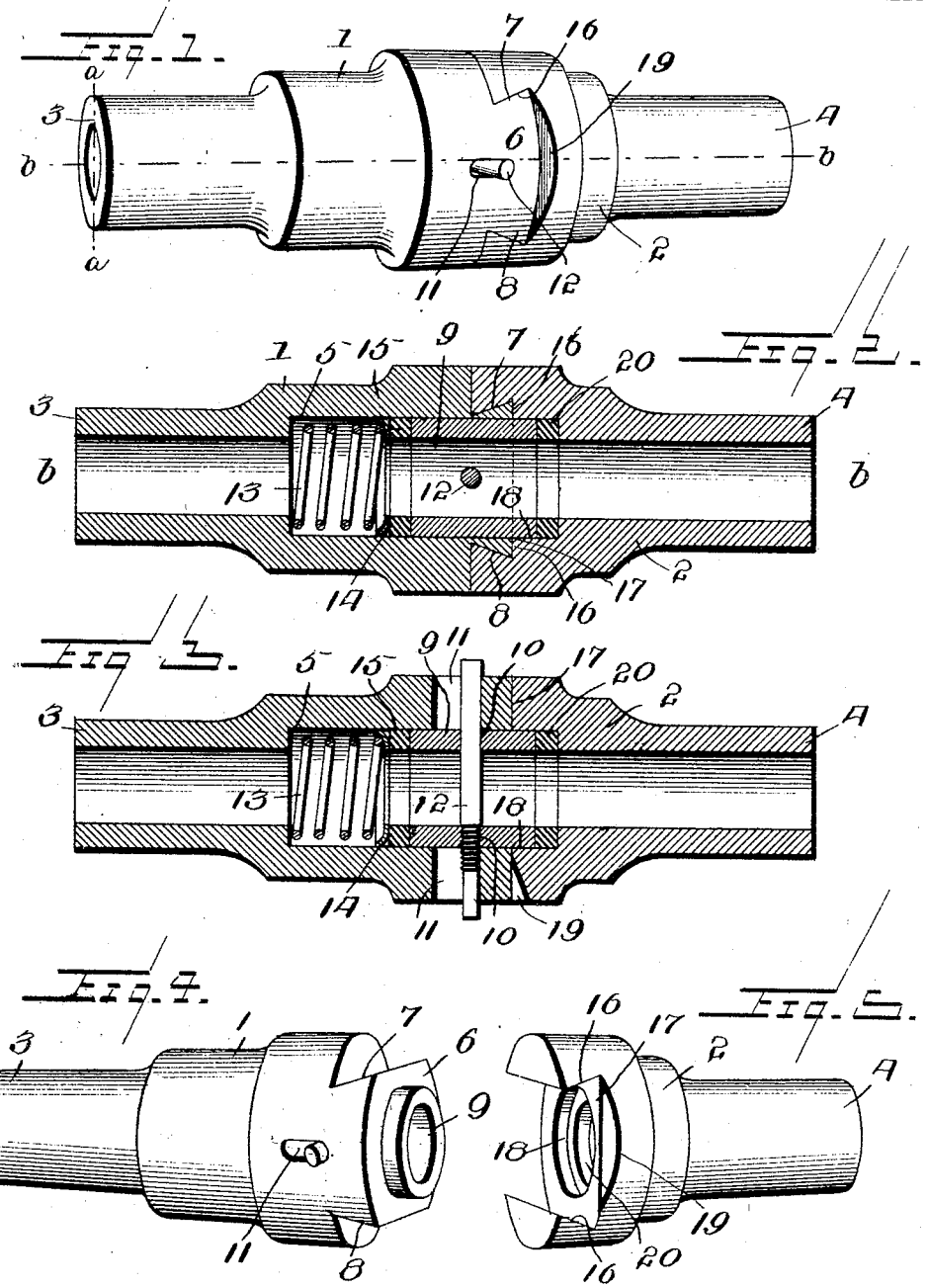

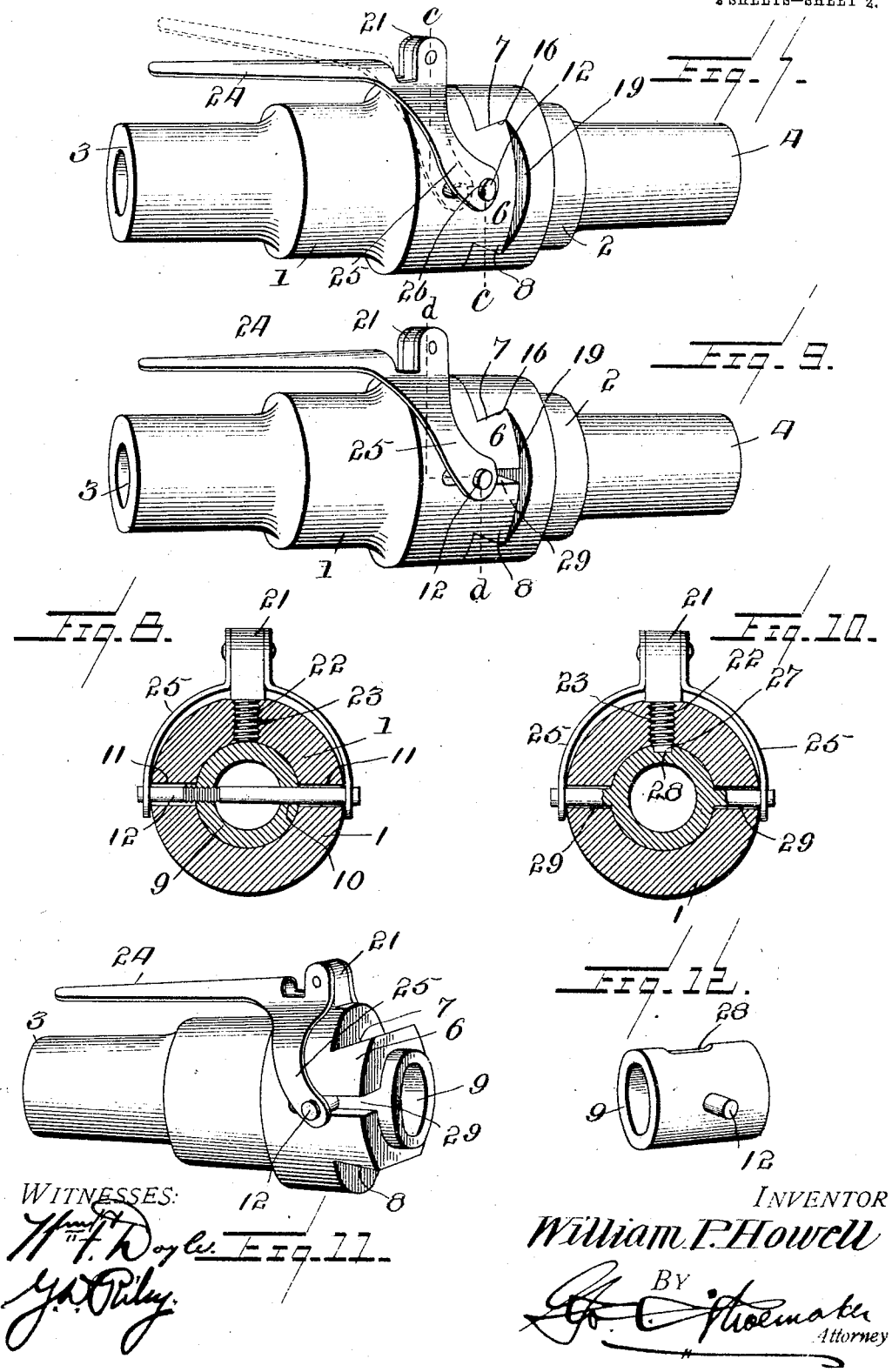

UNITED STATES PATENT OFFICE.

WILLIAM PETWAY HOWELL, OF COLUMBIA, TENNESSEE.

PIPE-COUPLING.

SPECIFICATION forming part of Letters Patent No. 779,479, dated January 10, 1905.

Application filed November 19, 1903. Serial No. 181,838.

*To all whom it may concern:*

Be it known that I, WILLIAM PETWAY HOWELL, a citizen of the United States, residing at Columbia, in the county of Maury and State of Tennessee, have invented certain new and useful Improvements in Pipe-Couplings, of which the following is a specification.

This invention relates to pipe or hose couplings, and has for one of its objects to provide an exceedingly simple, durable, and economical coupling of the character named.

One object of the invention resides in the formation of opposing members for coupling pipe, hose, or other connections and positively locking the opposing members together.

A still further object is to provide a hose-coupling made up of parts absolutely free of threaded engagement one part with relation to another.

It is still further designed to provide a coupling of the character named wherein a positive locking thereof will be accomplished automatically.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the present invention.

In the drawings, Figure 1 is a perspective view of the invention, illustrating one form of coupling members in locked engagement. Fig. 2 is a longitudinal sectional view on the line *a a* of Fig. 1. Fig. 3 is a sectional view on the line *b b* of Fig. 1. Fig. 4 is a detail perspective view of one of the coupling members detached from engagement with its companion coupling member. Fig. 5 is a detail perspective view of the other coupling member. Fig. 6 is a detail perspective view of the tubular latch member. Fig. 7 is a perspective view of the invention in coupled position and provided with a lever for unlocking the coupling members. Fig. 8 is a sectional view on the line *c c* of Fig. 7. Fig. 9 is a perspective view of a modified form of the invention. Fig. 10 is a sectional view on the line *d d* of Fig. 9. Fig. 11 is a perspective view of one of the modified forms of coupling members, and Fig. 12 is a detail perspective view of the modified form of tubular latch.

Referring now to the accompanying drawings, and particularly to the invention illustrated in Figs. 1 to 6, inclusive, the reference characters 1 and 2 designate opposing hollow coupling members, of any suitable material, whose outer ends 3 and 4, respectively, are formed to receive the hose, pipe, or other connections, which may be fitted within or externally thereof in any suitable manner. The inner end of the coupling member 1 is preferably of greater internal and external diameter than that portion receiving the pipe, hose, or other connection, resulting in the formation of an internal annular shoulder 5 for a purpose presently understood, while the extreme inner end thereof is provided with a head or projection 6, whose face portion has opposite walls 7 and 8 beveled or undercut, as shown. Fitted for sliding movement within the inner end of the member 1 is a tubular latch member 9, provided with oppositely-disposed screw-threaded or other openings 10, which are designed to register with the oppositely-disposed slotted openings 11 of the coupling member 1, the openings 10 of the latch receiving the screw-threaded or otherwise formed end of a pin or other element 12, the ends of the latter protruding through the said slots and engaging opposite ends of the slots to limit the sliding movement of the latch. It is not altogether necessary to screw-thread the pin or other element 12, and it is to be understood, as intimated in the preceding sentence, that this pin or other element may be otherwise formed to register with and be secured to the tubular latch member. A coil-spring 13 or other resilient means is arranged within the tubular member 1 and has one of its ends disposed against the internal annular shoulder 5, there being a movable metallic washer or ring 14 arranged at the opposite end of the means 13 and whose opposite face is arranged in correlation with respect to a movable rubber ring or gasket 15, which is designed to meet the inner end of the latch, as shown. Thus it will be seen that the resilient means 13 is designed to force the tubular latch 9 outwardly and hold the latter normally protruding through the opening in the forward end of the coupling member 1 and that the rubber ring or gasket 15 not only prevents leakage between the coupling-joints, but performs also the function of rendering a cushioning effect to the latch member. The coupling member 2 is provided with an enlarged head, resulting in an enlarged internal diameter, the face of the head portion having oppositely-disposed beveled or undercut walls 16, resulting in a seat 17, whose bottom is provided with a depression or socket 18 and whose open ends are beveled, as indicated by the reference character 19, to facilitate the coupling of the members 1 and 2, as will be hereinafter more fully explained. A rubber ring or gasket 20 rests within the socket 18 to prevent leakage and cushion one end of the sliding latch. In order to fasten the coupling members together, the pin or other element 12 is forced backward to the rear end of the slots, causing the tubular latch 9 to be drawn into the member 1 against the tension of the resilient exerting means, when the said member may be slipped up the inclined or beveled open end 19 of the seat 17 of the coupling member 2, permitting the beveled or undercut walls of the members 1 to readily slide within the correspondingly beveled or undercut walls of the member 2 until the tubular latch registers with the socket 18, when the pin or other element 12 being released the latch will automatically seat itself within the socket 18 upon the ring or gasket 20, causing a positive locking of the members by reason of the inclined beveled or undercut walls and the fitting of the free end of the latch within the said socket, the resilient means 13 acting in the capacity of agent to effect the automatic locking of the joint.

The device above described is one capable of rendering efficient and satisfactory results for service of light capacity; but the device when used in connection with apparatus or the like employing gases or steam may possibly require a spring or other resilient means of greater strength than that used under other circumstances and conditions. Should a resilient exerting means of greater strength be employed, it may be found expedient or necessary to provide means other than the hands to force the latch back into its casing to lock the coupling members together. In such event it will be seen by reference to Figs. 7 and 8 of the drawings that a post 21, having a screw-threaded or other end 22, is designed to be seated in the screw-threaded or other form of recess 23 of the coupling member 1 and pivotally mounted upon which may be disposed a lever 24, having spaced ears 25 provided with perforations or openings 26 in their free ends for engagement with the free protruding ends of the pin or other element 12, as clearly shown in the drawings, the dotted lines indicating the position of the lever in its raised position to unlock the coupling members. It will thus be seen that no matter how strong the tension of the resilient means 13 may be the lever just alluded to is capable to draw the tubular latch member back into the coupling member 1. However, it is to be understood that I do not necessarily limit myself to this particular form of means for manipulating the latch against exerting means of strong tension.

In Figs. 9 to 12, inclusive, I have illustrated a modified form of coupling. In this arrangement I do away with the necessity of employing a pin or other element 13 extending through the tubular latch member. For instance, by reference to the figures of the drawings to which attention has just been invited it will be seen that a key or the like 27 may protrude through the coupling member 1 and seat itself within a shallow recess or groove 28 of the tubular latch and prevent the latter from becoming detached from the said coupling member when the coupling members are detached one from the other, and notwithstanding the fact that the resilient exerting means tends to force the latch outwardly at all times. It will be seen that the face of the head portion of the tubular member 1 of this modified form is provided with oppositely-disposed notches or slots 29, which are designed to receive the lateral oppositely-disposed integral projections 30 of the tubular latch member. Otherwise the latch member is of the same construction as that heretofore described, as is also the internal construction of both coupling members. It will now be understood that in this particular form of the invention in order to uncouple the coupling members it is simply necessary to force the lateral projections of the tubular member backward with relation to the member 1, when the latch will be unseated from its socket and the tubular members easily disengaged one from the other in the manner heretofore described.

The key or the like 27, referred to immediately above, need not necessarily have the post extension 21, but may terminate at its upper end flush with the outer surface of the coupling member. In such an event, of course, the lever 24 will not be used.

From the foregoing description, when viewed in connection with the accompanying illustrations, it will be seen that I provide a threadless hose, pipe, or other coupling connection wherein the parts are few and there is little, if any, possible danger of derangement of the parts forming my simple and efficient arrangement. In other words, one coupling member has not a threaded engagement with its companion coupling member, and the parts arranged in connection with the coupling members are not necessarily threaded with relation to said members or other parts forming the complete device.

I claim—

1. A threadless coupling, comprising a pair of hollow coupling members, a latch arranged within one of the members for engagement with the other member to lock the members together, and a lever mounted upon one of the members for uncoupling the latter.

2. A threadless coupling, comprising a pair of coupling members, a hollow latch arranged within one of the members for engagement with the other member to lock the members together, and a lever fulcrumed upon one of the members for uncoupling the latter.

3. A coupling, comprising a pair of hollow members, a tubular latch slidably mounted within one of the members, the other member having a socket arranged in its forward end for the reception of the free end of the latch, and means arranged within one of the members for effecting an automatic locking engagement of the pair of members when brought together, the locking means being so constructed and arranged as to permit of a sliding movement thereof to uncouple the said members.

4. A coupling, comprising a pair of hollow, threadless coupling members, one member having a latch slidably mounted within the bore thereof, the other member having a socket arranged in its forward end for the reception of the free end of the latch, and means arranged within one of the members for effecting an automatic locking engagement of the members when brought together, the locking means being so constructed and arranged to permit of a sliding movement thereof to uncouple the said members.

5. A coupling, comprising a pair of hollow coupling members, a tubular latch slidably mounted within one of the members, the other member having a socket arranged in its forward end for the reception of the free end of the latch, means carried by the latch to limit its sliding movement, and means arranged within one of the hollow members for effecting an automatic locking engagement of the pair of members when brought together.

6. A coupling, comprising a pair of hollow coupling members, a tubular latch slidably mounted within one of the members, the other member having a socket arranged in its forward end for the reception of the free end of the latch, means carried by the latch to limit its sliding movement, and means for effecting an automatic locking engagement of the pair of members when brought together, the locking means being so constructed and arranged to permit of a sliding movement thereof to uncouple the said members.

7. A coupling, comprising a pair of hollow, threadless coupling members, a tubular latch slidably mounted within one of the members, the other member having a socket arranged in its forward end for the reception of the free end of the latch, means carried by the latch to limit its sliding movement, and means for effecting an automatic locking engagement of the pair of members when brought together.

8. A coupling, comprising a pair of hollow coupling members, a latch slidably mounted within one of the members, means for effecting a positive locking engagement of the members when brought together, and a lever mounted upon one of the members for uncoupling the latter.

9. A coupling, comprising a pair of hollow coupling members, a tubular latch slidably mounted within one of the members, the other member having a socket arranged in its forward end for the reception of the free end of the latch, means arranged within one of the members for effecting an automatic locking engagement of the members when brought together, and means for uncoupling said members.

10. A coupling, comprising a pair of hollow coupling members, a tubular latch slidably mounted within one of the members, the other member having a socket arranged in its forward end for the reception of the free end of the latch, means arranged within one of the hollow members for effecting an automatic locking engagement of the pair of members when brought together, and a lever constructed and arranged to uncouple said members.

11. A coupling, comprising a pair of hollow, threadless coupling members, a tubular latch slidably mounted within one of the members, the other member having a socket arranged in its forward end for the reception of the free end of the latch, means for effecting an automatic locking engagement of the pair of members when brought together, and means constructed and arranged to uncouple the members.

12. A coupling, comprising a pair of hollow coupling members, a latch slidably mounted within one of the members, means for effecting an automatic locking engagement of the members when brought together, said members, latch and the said means being free of screw-threads, and a lever mounted upon one of the members for uncoupling the latter.

13. A threadless coupling, comprising a pair of hollow coupling members, a latch slidably mounted within one of the members for locking the latter together, means for effecting an automatic locking of the members when brought together, and a lever operatively connected to the coupling for uncoupling the members.

14. A threadless coupling, comprising a pair of coupling members, a latch arranged within one of the members for engagement with the other member to lock the members together, means arranged within one of the members in the rear of the latch for effecting an automatic locking of the members when the latter are brought together, and a lever mounted upon one of the members for uncoupling the members.

15. A coupling, comprising a pair of hollow coupling members, one of the members having a head portion provided with undercut walls, a latch slidably mounted within the bore of said member, the other member having a head portion provided with undercut walls and a seat arranged therebetween for the reception of the head portion of the other member, and means for automatically locking the coupling members when brought together.

16. A threadless coupling, comprising a pair of hollow coupling members, a tubular latch arranged within one of the members for engagement with the other member to lock the members together, and means carried by the tubular latch and piercing one of the members to permit an uncoupling of the members.

17. A threadless coupling, comprising a pair of hollow coupling members, a latch slidably mounted within one of the members for effecting a locking engagement of the latter when brought together, and means straddling one of the members and having engagement with the latch for uncoupling the members.

18. A threadless coupling, comprising a pair of hollow coupling members, a tubular latch slidably mounted within one of the members for coöperation with the other member to lock them together, and means arranged in one of the members for effecting an automatic locking of the members when brought together and a lever fulcrumed upon one of the members and coöperating with the latch to uncouple the members.

In testimony whereof I affix my signature in presence of two witnesses.

WILLIAM PETWAY HOWELL.

Witnesses:
JNO. W. FRY,
JOE F. BROWNLOW.